Oct. 5, 1926.
J. H. GRANT
1,602,300
AUTOMATIC SIGNAL
Filed Oct. 12, 1923
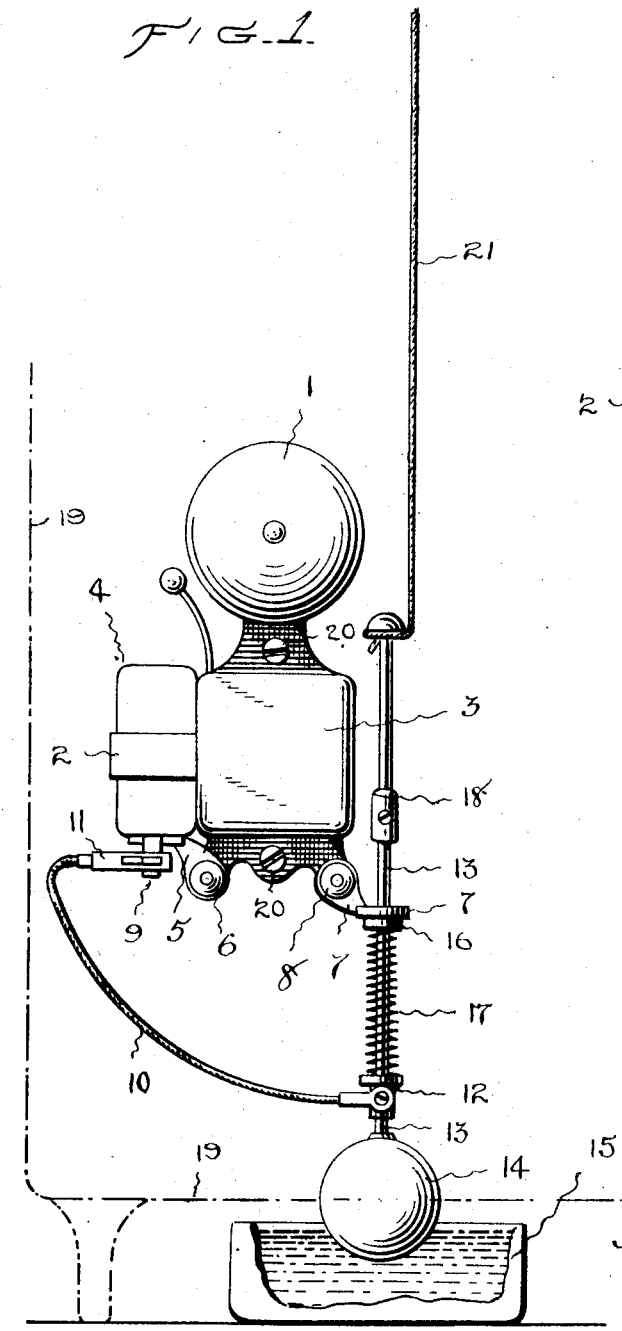
INVENTOR
James H. Grant,
BY
ATTORNEY Patented Oct. 5, 1926.

1,602,300

UNITED STATES PATENT OFFICE.

JAMES H. GRANT, OF WEST HAVEN, CONNECTICUT.

AUTOMATIC SIGNAL.

Application filed October 12, 1923. Serial No. 668,121.

The present invention relates to automatic signals or alarms and the invention has been designed for a particular application, that is, for use in connection with refrigerators to give an automatic signal when the drip pan of the refrigerator is about to overflow.

Heretofore various devices, both mechanical and electrical, have been devised for automatically indicating a determined depth of the water within the drip pan of a refrigerator. The object of the present invention is to improve previously known devices in such a way that the various parts of the device may be assembled so as to be self-contained whereby the device may be more readily handled, applied and further the device may be manufactured at a comparatively low cost. Besides these advantages, the efficiency of the device is materially increased.

The invention will be particularly described hereinafter as applied to a refrigerator and reference will be made to the accompanying drawings, wherein—

Figure 1 is a side elevation of the complete signaling device in its position for operation, and Figure 2 is a detail view showing a clip for securing the battery cell to the casing of an electric bell or buzzer.

In carrying out the embodiment of the invention as shown in the drawings, the improved signaling device comprises an electric bell 1, of any ordinary type, a spring clip 2 is secured to the casing 3 of the bell and a battery 4 is held within the clip 2 so that by gravity alone one of the terminals of the battery is maintained in electrical contact with the fixed contact 5, which latter contact is preferably detachably secured to one terminal 6 of the electric bell. A similar fixed contact 7 is secured to the terminal 8 of the bell. The other terminal 9 of the battery is electrically connected, by a flexible connection 10, through spring contact clip 11 to the connector 12, which latter is mounted on the rod 13 which is composed of a non-conducting material. A float 14 is carried at the lower end of rod 13, and when in operation, the rising of the water in the drip pan 15, lifts the float and rod 13 so that contact 16 is brought into contact with the contact 7 and the electric circuit is thus completed. A spring 17 carriers the current from contact 12 to contact 16 and this spring 17, it will be understood, is provided so that the rod 13 and with it the float 14 may be conveniently raised to clear the top edge of the drip pan. An adjustable stop 18 is carried on the rod 13 so that adjustment may be obtained to meet different conditions arising from different depths of the drip pan and various elevations of the refrigerator 19, to which the device is readily secured by means of screws 20 in any desirable location. In such cases where the apparatus is located on the back of the refrigerator and therefore not easily accessible for the purpose of lifting the rod 13 to allow removal of the drip pan, a cord 21 is provided so that the rod may be lifted from a distant point.

Obvious modifications may be made, both as regards the construction and the application of the improved device and it is to be understood any modification coming fairly within the terms of the appended claim shall be covered therein.

I claim:—

In an automatic signal as described, a casing containing an electric bell; a clip secured to said casing; a battery cell held by said clip; terminals for said cell and bell; one bell terminal and one cell terminal being in permanent electrical connection and the other terminals being electrically connected by a device arranged to make and break the electric circuit; said device comprising a movable member, a connector mounted on said member, a movable contact slidably mounted on said member and arranged to contact with a contactor connected to the free bell terminal, a spring conductor interposed between said connector and movable contact, a flexible connection between said connector and the free cell terminal and a float carried by said member operating to raise said member to complete the electric circuit.

Signed at New Haven, in the county of New Haven and State of Connecticut this 10th day of October, A. D. 1923.

JAMES H. GRANT.